United States Patent [19]

Gagnon

[11] Patent Number: 4,598,225

[45] Date of Patent: Jul. 1, 1986

[54] ELECTRIC LAMP WITH HIGH OUTER-ENVELOPE TO INNER-ENVELOPE WALL-THICKNESS RATIO

[75] Inventor: Peter R. Gagnon, Georgetown, Mass.

[73] Assignee: GTE Products Corporation, Stamford, Conn.

[21] Appl. No.: 469,843

[22] Filed: Feb. 25, 1983

[51] Int. Cl.⁴ .......................... H01J 5/12; H01K 1/34
[52] U.S. Cl. ..................................... 313/17; 313/579; 313/634
[58] Field of Search ................. 313/17, 579, 578, 580, 313/573, 634, 25; D26/2; 445/22, 27; 362/164

[56] References Cited

U.S. PATENT DOCUMENTS

| D. 261,812 | 11/1981 | Bowles et al. | D26/2 |
| 2,030,437 | 2/1936 | Francis et al. | 313/634 X |
| 3,136,913 | 6/1964 | Goodman | 313/116 X |
| 3,138,731 | 6/1964 | Beese | 313/113 |
| 3,209,192 | 9/1965 | Decker | 313/116 |
| 3,479,548 | 11/1969 | Schlessel | 313/25 X |
| 4,015,158 | 3/1977 | Roller et al. | 313/579 X |

Primary Examiner—Palmer C. DeMeo
Assistant Examiner—Sandra L. O'Shea
Attorney, Agent, or Firm—William H. McNeill; Joseph S. Romanow

[57] ABSTRACT

An electric lamp having a relatively high outer-envelope to inner-envelope wall-thickness ratio whereby the risk of a containment failure of the lamp is substantially eliminated. In an alternate embodiment, the outer envelope has a concave top. In another embodiment, the neck of the outer envelope has a relatively thick wall. Lamps having a wall-thickness ratio falling within the prescribed range, i.e., approximately equal to or greater than 3, have the property that the outer envelope will contain shards of the inner light-source capsule in the unlikely event such inner capsule should burst.

9 Claims, 1 Drawing Figure

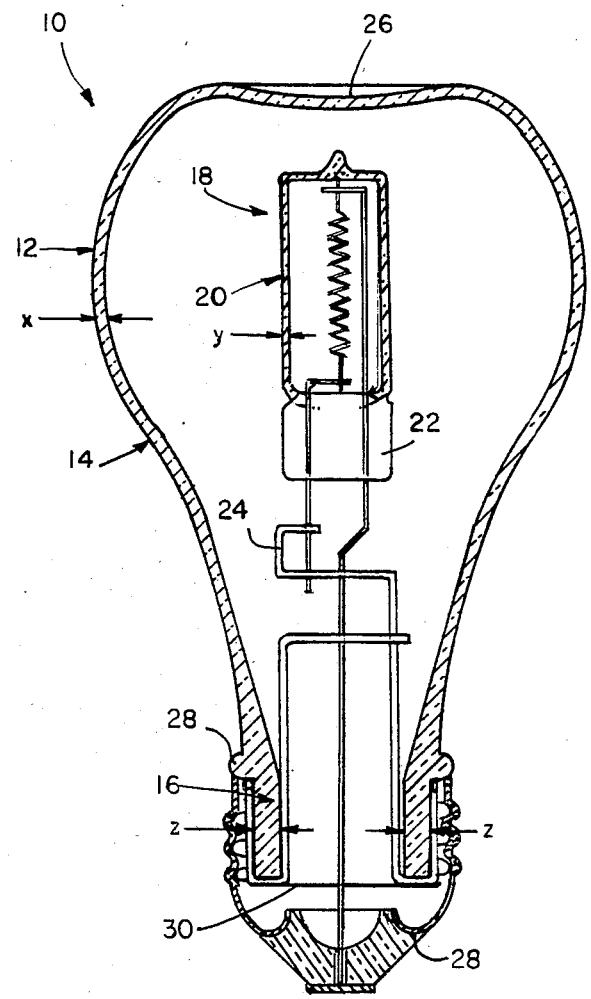

ELECTRIC LAMP WITH HIGH OUTER-ENVELOPE TO INNER-ENVELOPE WALL-THICKNESS RATIO

CROSS REFERENCES TO RELATED APPLICATIONS

U.S. patent applications, Ser. No. 792,620, filed Oct. 24, 1985, a continuation of Ser. No. 469,841, filed Feb. 25, 1983, now abandoned; Ser. No. 469,844, filed Feb. 25, 1983; and Ser. No. 835,409, filed Mar. 3, 1986, a continuation of Ser. No. 469,843, filed Feb. 25, 1983; all assigned to the assignee hereof, contain related subject matter.

TECHNICAL FIELD

This invention relates to electric lamps and more particularly to such lamps employing light-source capsules which operate at pressures other than atmospheric. Still more particularly, this invention relates to such lamps having a relatively high ratio of the wall thickness of the outer envelope to the wall thickness of the inner envelope whereby the risk of a containment failure of the lamp is substantially eliminated.

BACKGROUND ART

Tungsten-halogen incandescent lamps and arc discharge lamps are well known; see *IES LIGHTING HANDBOOK*, 1981 Reference Volume, Section 8. There is a small probability that a metal halide or tungsten-halogen lamp will shatter during operation of the lamp. On the infrequent occasion that a lamp shatters, the sequence of events within the lamp is as follows: the inner light-source capsule bursts causing fragments of glass or shards to be propelled against the outer envelope; these shards cause the outer envelope of the lamp to shatter. This type of lamp failure will hereinafter be referred to as a "containment failure" of the lamp.

The causes of these infrequent containment failures are varied and unpredictable. There is no known way to eliminate the possibility of such failures. Although occurrence of the failure is rare, nevertheless it could present a safety hazard to a person in the immediate vicinity of a lamp or a possibility of damage to nearby property. Where such failures can be anticipated, lamp manufacturers notify users by means of warnings on packages and other descriptive materials and by suggested precautions in specifications. This hazard may be avoided by operating the lamp in a fixture designed to contain such a failure. The requirement that the lamp be operated in a protective fixture is frequently employed in commercial usage. However, this procedural safeguard is less acceptable for consumer usage.

The lighting industry is searching for a replacement for the Edison-type incandescent lamp which is currently the most popular type of lamp sold in the consumer market in the United States. Tungsten-halogen and arc discharge lamps, because of their superior performance characteristics, are being carefully considered by various lamp manufacturers as a replacement for the standard incandescent lamp. However, the remote possibility of a containment failure is a substantial impediment in the path of developing a feasible replacement in the consumer market. A tungsten-halogen lamp or an arc discharge lamp which substantially eliminates the risk of a containment failure would constitute an advancement in the art.

Various methods have been suggested to improve the ability of tungsten halogen and arc discharge lamps to withstand a burst of the inner light-source capsule. These methods may attempt to restrict shards from impacting with the outer envelope, may reinforce the outer envelope so that it will not shatter in the event shards are propelled against it, or may employ a combination of both techniques. The practice of applying a light-transmissive coating or covering on the inside or outside surface of the outer envelope as reinforcement thereof is well known in the art. Bechard et al., in U.S. Pat. No. 4,281,274, issued July 28, 1981, disclose an enclosure of glass surrounding the arc tube of an arc discharge lamp as a containment device. In copending U.S. patent application, Ser. No. 422,311, filed on Sept. 23, 1982, and assigned to the assignee hereof, there is disclosed a knitted wire mesh containment device surrounding the light-source capsule of an arc discharge lamp or a tungsten-halogen lamp. A light-source capsule containment device comprising glass wool being packed approximately uniformly between the light-source capsule and the outer envelope is disclosed in copending U.S. patent application, Ser. No. 440,123, filed Nov. 8, 1982, and assigned to the assignee hereof. Abandoned U.S. patent application, Ser. No. 845,738, filed Oct. 26, 1977, by Fridrich, referred to in U.S. Pat. No. 4,151,445, suggests that the risk of a containment failure may substantially be eliminated in an arc discharge lamp having a miniaturized arc tube with thinner walls.

These methods of containment generally necessitate additional hardware and result in increased costs of manufacture. There is usually some loss of efficacy associated with these methods. In most instances, such containment devices detract from the aesthetic appearances of lamps. There is no means of containment available in the existing art for general lighting applications which is reliable, which incures no additional manufacturing costs, which results in no measurable loss of efficacy, and which does not detract from the aesthetic quality of the lighting product.

DISCLOSURE OF THE INVENTION

It is, therefore, an object of this invention to obviate the deficiencies in the prior art.

It is another object of this invention to provide a means of containment for electric lamps which will substantially eliminate the possibility of a containment failure.

Another object of this invention is to provide an economical solution to the containment problems of the prior art.

A further object of this invention is to provide a means of containment which does not detract from the aesthetic appearance of lamps.

Another object of this invention is to provide a means of containment which will cause no measurable loss of luminous efficacy in lamps employing such means.

Still another object of this invention is to overcome a substantial impediment in the path of developing a replacement for the standard incandescent lamp in the consumer market.

These objects are accomplished, in one aspect of the invention, by the provision of an electric lamp comprising an outer envelope and a light-source capsule mounted within the outer envelope. The outer envelope has a minimum wall thickness, x. The light-source capsule has a body and at least one end. The body of the light-source capsule has a maximum wall thickness, y, of less than approximately 0.9 millimeters. In such lamps, the ratio x/y is approximately equal to or greater than 3.

Lamps constructed as described above will contain shards of the inner light-source capsule in the unlikely event such capsule should burst. Further, such lamps may be manufactured economically; they have no measurable loss of luminous efficacy; and the aesthetic appearance of such lamps is equivalent to or better than lamps currently available.

BRIEF DESCRIPTION OF THE DRAWINGS

The single FIGURE is an elevational cross-sectional view of an embodiment of the invention.

BEST MODE FOR CARRYING OUT THE INVENTION

For a better understanding of the present invention, together with other and further objects, advantages, and capabilities thereof, reference is made to the following disclosure and appended claims taken in conjunction with the above-described drawings.

As used herein, the term "light-source capsule" denotes: a tungsten-halogen incandescent capsule; an arc tube of an arc discharge lamp; or any light-emitting capsule within the outer envelope of a lamp where the light-source capsule operates at a pressure other than atmospheric and the possibility of a lamp containment failure exists. The light-source capsule may be either a single-ended or double-ended capsule.

The terms "contain" or "containment" as used herein mean that the outer envelope of the lamp does not shatter as a result of a burst of the inner light-source capsule. Shards of the light-source capsule remain within the outer envelope.

The terms "efficacy" or "luminous efficacy" used herein are a measure of the total luminous flux emitted by a light source over all wavelengths, expressed in lumens per watt.

The figure shows lamp 10 comprising outer envelope 12 and light-source capsule 18 being mounted within outer envelope 12, for example, on frame-assembly 24. Outer envelope 12 has a body 14 and a neck 16. Body 14 has a minimum wall thickness, x. Light-source capsule 18 has a body 20 and at least one end 22. Body 20 of capsule 18 has a maximum wall thickness, y, of less than approximately 0.9 millimeters.

In lamp 10, the ratio of x/y, which hereinafter will be referred to as the "wall-thickness ratio," is approximately equal to or greater than 3. When such a relationship exists, capsule 18 will be described herein as being "thin-walled" with respect to outer envelope 12, and conversely outer envelope 18 will be described as being "thick-walled" with respect to capsule 12. The prescribed range of the wall-thickness ratio insures that these comparative measures of "thick" and "thin" will be true by a factor of approximately 3 or greater.

The importance of the prescribed range of the wall thickness ratio is as follows. When a thin-walled capsule bursts into shards, each shard is relatively thin and possesses less mass than would be the case if the capsule were not thin-walled. When these low-mass shards impact with the outer envelope, the impact energy per collision is reduced because energy is proportional to mass. The thinner shards tend to shatter themselves thereby dissipating collision energy harmlessly. There is evidence from observations that thin-wall capsules burst into greater numbers of smaller shards than do capsules with greater wall thicknesses under similar operating conditions. This property of thin-wall capsules further lessens the mass per shard and consequently the energy per shard-collision with the outer envelope. The greater the number of shards impacting with the outer envelope, the more the total energy of the burst will be spread uniformly over the outer envelope. The cumulative result of these factors is that the outer envelope has the ability to contain an inner capsule burst when the wall-thickness ratio is within the prescribed range.

In an alternate embodiment of the invention, outer envelope 12 has a concave top 26 opposed to neck 16. The word "concave" means that the radius or radii of curvature of top 26 falls on the exterior of outer envelope 12. The concave shape of top 26 diverts shards and energy of a burst of capsule 18 toward base 28 where they are least likely to cause harm or damage; in so doing, top 26 shatters many shards which further dissipates burst energy. Top 26 also reinforces outer envelope 12 above capsule 18. This region of outer envelope 12 may require reinforcement for two reasons. First, top 26 may be the portion of outer envelope 26 closest to capsule 18. Second, there is the possibility that capsule 18 may burst such that the upper portion of capsule 18, i.e., the portion of capsule 18 closer to top 26, may be propelled against top 26. This type of burst may occur if body 20 of capsule 18 is fractured near press seal 22. If such a fracture should occur, the high pressure within capsule 18 may propel the portion of capsule 18 above press seal 22 toward top 26. It is believed that the region of capsule 18 where body 20 joins press seal 22 may be particularly susceptible to thermally induced fractures because of the substantial temperature gradient in this region caused by the high operating temperature of body 20 and the relatively cool operating temperature of press seal 22.

Outer envelope 12 has neck 16 running from ring 28 to brim 30. In another embodiment of the invention, minimum wall thickness, z, of neck 16 is approximately equal to or greater than 2.5 millimeters. The extra thickness of neck 16 facilitates the mounting of frame-assembly 24 on neck 16 by means of elastic and frictional forces. For a detailed explanation of the means for mounting frame-assembly 24 with capsule 18 thereon within outer envelope 12, see copending U.S. patent application, Ser. No. 792,620, filed Oct. 24, 1985 by Blaisdell et. al., filed concurrently herewith and assigned to the assignee hereof, the teachings of which are incorporated herein by reference.

Outer envelope 12 may be highly light-transmissive so that the efficacy of lamp 10 may be optimized. In other embodiments, outer envelope 12 has a light-diffusive coating on an interior or exterior surface thereof; or outer envelope 12 has light-diffusive facets formed in a surface thereof; or outer envelope 12 may employ both such coating and such facets. The term "facets" includes stipling or matte.

In laboratory examples, outer envelopes 12 were formed from soda-lime glass with concave tops 26. Bodies 12 had minimum wall thicknesses of approximately 1.9 millimeters. Capsules 18 were large-volume tungsten-halogen capsules, made from alumino silicate glass, having a volume of approximately two cubic centimeters. Bodies 20 had maximum wall thicknesses of approximately 0.64 millimeters. The operating pressures of capsules 18 ranged from approximately 6 to 15 atmospheres. In all examples, capsules 18 were induced to burst and outer envelopes 12 contained such bursts. In all examples, there was no discernible loss in luminous efficacy.

Thin-walled capsules offer potential economies in costs of materials and construction. Capsules 18 are generally constructed from quartz or hard glass which have relatively high costs per pound. Because thin-walled capsules employ less glass per unit, a significant reduction in the cost of materials may be realized. Also, thinner glass requires less annealing time thus producing savings in energy and further economies realized from faster production-line processing.

While there have been shown what are at present considered to be the preferred embodiments of the invention, it will be apparent to those skilled in the art that various changes and modifications can be made herein without departing from the scope of the invention as defined in the appended claims.

I claim:

1. An integral double-enveloped tungsten-halogen lamp for general lighting applications comprising:
    (a) an outer envelope formed from light-transmissive material, said outer envelope having a body and a neck, said body of said outer envelope having a minimum wall thickness, x;
    (b) an inner envelope being a tungsten-halogen light-source capsule, said light-source capsule having a body and at least one end, said body of said light-source capsule having a maximum wall thickness, y, of less than approximately 0.9 millimeters;
    (c) mounting means for mounting said light-source capsule within said outer envelope, said mounting means being mounted on said outer envelope;
    (d) a base mounted on said neck of said outer envelope, said base having means for receiving electrical power from an external source;
    (e) electrical means within said outer envelope for completing an operational electrical circuit between said base and said light-source capsule; and
    (f) a wall-thickness ratio, x/y, being approximately equal to or greater than 3, whereby said outer envelope is capable of containing a burst of said light-source capsule in the unlikely event said burst should occur.

2. A lamp as described in claim 1 wherein the operating pressure within said light-source capsule is greater than atmospheric pressure.

3. A lamp as described in claim 1 wherein said body of said outer envelope includes a concave top formed therein, said concave top being opposed to said neck of said outer envelope.

4. A lamp as described in claim 1 wherein the minimum wall thickness of said neck of said outer envelope is approximately equal to or greater than 2.5 millimeters.

5. A lamp as described in claim 1 wherein said light-source capsule is single-ended.

6. A lamp as described in claim 1 wherein said outer envelope has a light-diffusive coating on a surface thereof.

7. A lamp as described in claim 1 wherein said outer envelope has light-diffusive facets formed in a surface thereof.

8. A lamp as described in claim 1 wherein said mounting means is a frame-assembly formed from stiff electrically conductive material and said electrical means includes said frame-assembly as a portion thereof.

9. A lamp as described in claim 1 wherein said base is a standard Edison-type base.

* * * * *